United States Patent
Klots et al.

(10) Patent No.: US 10,223,437 B2
(45) Date of Patent: Mar. 5, 2019

(54) ADAPTIVE DATA REPARTITIONING AND ADAPTIVE DATA REPLICATION

(71) Applicant: Oracle International Corporation, Redwood Shores, CA (US)

(72) Inventors: Boris Klots, Belmont, CA (US); Vikas Aggarwal, Redwood City, CA (US); Nipun Agarwal, Saratoga, CA (US); John Kowtko, Redwood City, CA (US); Felix Schmidt, Redwood City, CA (US); Kantikiran Pasupuleti, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 479 days.

(21) Appl. No.: 14/634,199

(22) Filed: Feb. 27, 2015

(65) Prior Publication Data

US 2016/0253402 A1 Sep. 1, 2016

(51) Int. Cl.
*G06F 17/30* (2006.01)
*G06F 17/00* (2006.01)
*G06F 7/00* (2006.01)

(52) U.S. Cl.
CPC .............. *G06F 17/30584* (2013.01)

(58) Field of Classification Search
None
See application file for complete search history.

(56) References Cited

U.S. PATENT DOCUMENTS

| | | | | |
|---|---|---|---|---|
| 9,031,994 B1* | 5/2015 | Cao | ............ | G06F 17/30958 |
| | | | | 707/798 |
| 9,384,227 B1* | 7/2016 | Xiao | ............ | G06F 17/30584 |
| 9,779,117 B1* | 10/2017 | Guo | ............ | G06F 17/30292 |
| 2005/0198102 A1* | 9/2005 | Hahn | ............ | G06F 9/44505 |
| | | | | 709/200 |
| 2006/0036989 A1* | 2/2006 | Chaudhuri | ........ | G06F 17/30312 |
| | | | | 717/101 |
| 2006/0085484 A1* | 4/2006 | Raizman | ........... | G06F 17/30336 |
| 2008/0263001 A1* | 10/2008 | Lohman | ............ | G06F 17/30445 |
| 2009/0055828 A1* | 2/2009 | McLaren | ............ | G06F 11/3447 |
| | | | | 718/103 |
| 2009/0144303 A1* | 6/2009 | Bhide | ............ | G06F 17/30312 |

(Continued)

OTHER PUBLICATIONS

Zilio et al. "Partitioning Key Selection for a Shared-Nothing Parallel Database System", IBM Research Report RC, dated Nov. 10, 1994, 27 pages.

(Continued)

*Primary Examiner* — David T. Brooks
(74) *Attorney, Agent, or Firm* — Hickman Palermo Becker Bingham LLP (57) ABSTRACT

A method and apparatus for adaptive data repartitioning and adaptive data replication is provided. A data set stored in a distributed data processing system is partitioned by a first partitioning key. A live workload comprising a plurality of data processing commands is processed. While processing the live workload, statistical properties of the live workload are maintained. Based on the statistical properties of the live workload with respect to the data set, it is determined to replicate and/or repartition the data set by a second partitioning key. The replicated and/or repartitioned data set is partitioned by the second partitioning key.

22 Claims, 7 Drawing Sheets

(56) References Cited

U.S. PATENT DOCUMENTS

| | | | |
|---|---|---|---|
| 2009/0144346 A1* | 6/2009 | Duffy | G06F 17/30445 |
| 2009/0157776 A1* | 6/2009 | McGarvey | G06F 17/30584 |
| 2010/0030741 A1* | 2/2010 | Johnson | G06F 17/30457 707/718 |
| 2010/0262687 A1* | 10/2010 | Shen | G06F 17/30584 709/224 |
| 2010/0281027 A1* | 11/2010 | Duan | G06F 17/30584 707/737 |
| 2011/0161294 A1* | 6/2011 | Vengerov | G06F 17/30581 707/637 |
| 2011/0225122 A1* | 9/2011 | Denuit | G06F 17/30174 707/634 |
| 2013/0226959 A1* | 8/2013 | Dittrich | G06F 17/30312 707/769 |
| 2013/0232176 A1* | 9/2013 | Plattner | G06F 17/30289 707/803 |
| 2014/0012881 A1* | 1/2014 | Roesch | G06F 17/30312 707/792 |
| 2014/0279892 A1* | 9/2014 | Bourbonnais | G06F 17/30584 707/633 |
| 2014/0337392 A1* | 11/2014 | Gorde | G06F 17/30309 707/812 |

OTHER PUBLICATIONS

Wang et al., "ASAWA: An Automatic Partition Key Selection Strategy", APWeb 2013, LNCS, dated 2013, Springer-Verlag Berlin Heidelberg, 12 pages.

Nehem et al., "Automated Partitioning Design in Parallel Database Systems", SIGMOD, dated Jun. 2011, ACM, 12 pages.

* cited by examiner

ADAPTIVE DATA REPARTITIONING AND ADAPTIVE DATA REPLICATION

FIELD OF THE INVENTION

The present invention relates to database systems and, in particular, to adaptive data repartitioning and adaptive data replication.

BACKGROUND

Many enterprise software customers, such as those engaged in telecommunications, financial services, and customer relationship management, must handle increasing amounts of data. These customers require applications that are scalable across multiple computing resources. The general shift toward cloud computing also means that many of these applications will be deployed across multiple physical and virtual machines.

One of the major challenges in a scale-out system is distributing data over a large number of nodes in a manner that supports efficient processing of data. In context of data analytics, NoSQL and SQL processing, this process of data distribution is often referred to as partitioning the data. It is common for such systems to partition the data across all (or a subset) of the nodes by a chosen partitioning key. However, queries from typical analytical workloads perform several join and aggregation operations, on different keys and different parts of data. As a result, scale-out systems often need to reshuffle the data dynamically based on query requirements. As used herein, the term "reshuffling" refers to data movement between distributed database elements, such as to process one or more data processing commands and/or queries. One example of reshuffling is when a query execution plan prescribes a particular partitioning key that is different than the partitioning key for the base data set. Although this may be referred to as repartitioning in the art, the term "repartitioning" is used herein to refer to changing the partitioning key of the base data set.

Reshuffling requires a significant overhead that affects query response time. Performing reshuffling involves movement of large amounts of data between processing nodes using some interconnection fabric, and can easily form a significant proportion of the overall execution time of a query, sometimes as high as 50-60%. As a result, performance and scaling of many operations such as joins and aggregates hinges on the efficiency of the reshuffling task and/or the partitioning key by which the base data set is partitioned.

Many existing systems attempt to choose an initial partitioning key based on estimates about target workload in a way that reduces the aggregate amount of data that needs to be communicated due to reshuffling during query execution. One weakness of this approach is that making assumptions about the characteristics of a workload in advance can be difficult and inaccurate, leading to a suboptimal choice of an initial partitioning key. Furthermore, workload characteristics may evolve over time, thereby changing the optimal selection of a partitioning key with time.

Many systems employ high-bandwidth networks to reduce the amount of time spent to reshuffle the data. However, the cost and power associated with such high-speed network is often prohibitive. The problem is compounded by the congestion associated with communication patterns (all-to-all or many-to-many) that is often exhibited by data reshuffling, which makes it difficult to utilize the peak bandwidth capabilities of the interconnect fabric. When hundreds to thousands of nodes are involved in a many-to-many communication operation, the effective bandwidth achieved is typically a fraction of the theoretical peak.

Some systems circumvent the problem by replicating the data on every node. In this case, every node stores multiple copies of the same table, where each copy is partitioned by a different partitioning key. Because it is impractical to store redundant copies of every table partitioned by every possible partitioning key, such a strategy is applied to a limited subset of tables and partitioning keys. The redundancy associated with such an approach increases the memory/space requirements of the systems and their costs. Such resource overheads become increasingly pronounced as systems scale out.

With exponential growth in the sizes of the datasets that need to be queried and analyzed, scale-out systems are becoming increasingly important for data analytics and query processing. For such scale-out systems, reshuffling overhead, or the overhead of reshuffling data, presents a significant challenge in scaling the performance of several operations efficiently. Thus, there is a need for reducing reshuffling overhead, such as during data analysis or query execution.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for adaptive data repartitioning and adaptive data replication. For one or more data sets, such as one or more tables, partitioning strategies and/or replication strategies are selected to reduce reshuffling overhead during query execution. The approach outlined here does not require deep integration with a query optimizer and is lightweight enough to run during the processing of a live workload. This capability allows a scale-out data processing system to adapt its partitioning strategy and/or replication strategy as the live workload is processed. As used herein, a data processing system refers to any computer system configured to store and/or process data, including but not limited to a relational database, non-relational database, NoSQL systems, and the like.

In a distributed data processing system, one or more data sets are distributed across multiple distributed database elements. For example, a data set may be partitioned based on a partitioning key, and the partitions may be stored on two or more distributed database elements. Some data processing commands and/or queries require the reshuffling of data. Reshuffling of a data set is related to the current partitioning key for the data set because the current partitioning of the data determines where the data currently resides. Reshuffling may involve a movement of data based on another partitioning key in order to process one or more data processing commands and/or queries. For example, a query execution plan may require the data to be partitioned based on a different partitioning key than the current partitioning key.

While it is difficult to select the partitioning key that minimizes the aggregate amount of data movement due to reshuffling based on pre-existing knowledge of the workload, such information can be collected at runtime by analyzing the statistical properties of the workload. The statistical properties of a live workload can change over time, in which case repartitioning of the base data set by a different partitioning key may be more optimal. The statistical properties of the live workload are used to dynamically determine how to repartition the data set by a more optimal partitioning key so that the total overhead of reshuffling data for subsequent database operations is potentially reduced. As used herein, the term "repartitioning" refers to changing the partitioning key for a base data set. In an embodiment, repartitioning comprises using of another partitioning key or hash compared to the currently used, and re-allocation of resulting partitions for one or more base tables of the data set across system nodes. After changing the partitioning key for a base data set, a database server may be configured to perform maintenance and other database operations on the repartitioned data set based on the new partitioning key.

One or more embodiments are directed to adaptive data repartitioning. An initial partitioning key is selected for a data set stored in a database. As used herein, the term "data set" refers to at least a subset of data stored in a data processing system. In an embodiment, the data set comprises one or more tables. A live workload is processed by the data processing system. As used herein, the term "workload" refers to a set of one or more data processing commands ("queries") which store, retrieve, update and/or delete user data. As used herein, the term "live workload" refers to commands processed by the data processing system while the data processing system is available, or online. A live workload is typically open-ended because a data processing system that is online must continue to process incoming commands after handling commands that are already received. While processing the live workload, statistical properties of the live workload are maintained. Based on the statistical properties of the live workload with respect to the data set, a decision can be made to repartition the data set by a different partitioning key. In an embodiment, the data set is repartitioned while the data processing system is online.

One or more embodiments are directed to adaptive data replication. Statistical properties of a live workload are maintained, and a determination is made to replicate a data set based on an additional partitioning key. The determination is based on the statistical properties of the live workload with respect to the data set. In an embodiment, the determination is further based on an amount of available memory and/or a size of the data set. In an embodiment, the determination further comprises identifying, from a plurality of data sets stored in the database, one or more data sets to replicate. For example, the database may store a plurality of tables, and a particular table is chosen to replicate. The replicated copy is partitioned by a partitioning key different from the initial partitioning key, such that the overhead of reshuffling data for subsequent database operations is potentially reduced by using either copy of the data set.

Structural Overview

In one embodiment, the techniques described herein are performed on a distributed database server. A database server is a combination of integrated software components and an allocation of computational resources, such as memory and processes on a computing device, where the combination governs and provides access to a particular database. Users interact with a database server by submitting commands that cause the database server to perform operations on data stored in a database. A user may be one or more client applications and/or client processes running on a client computer. Multiple users may also be referred to herein collectively as a user.

Figure 1A:
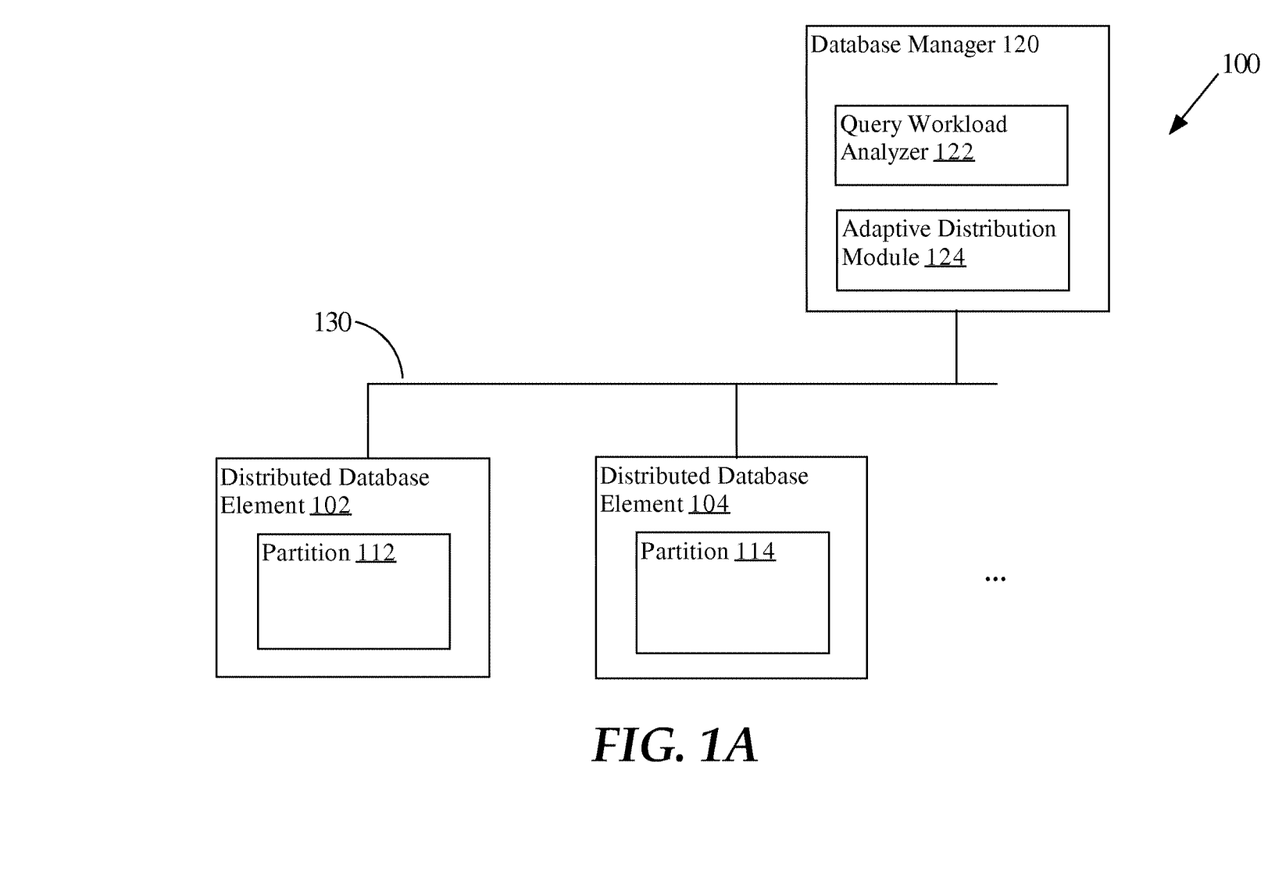
FIGS. 1A-1B are block diagrams of embodiments of distributed database systems on which the techniques described herein may be practiced.
Figure 1B:
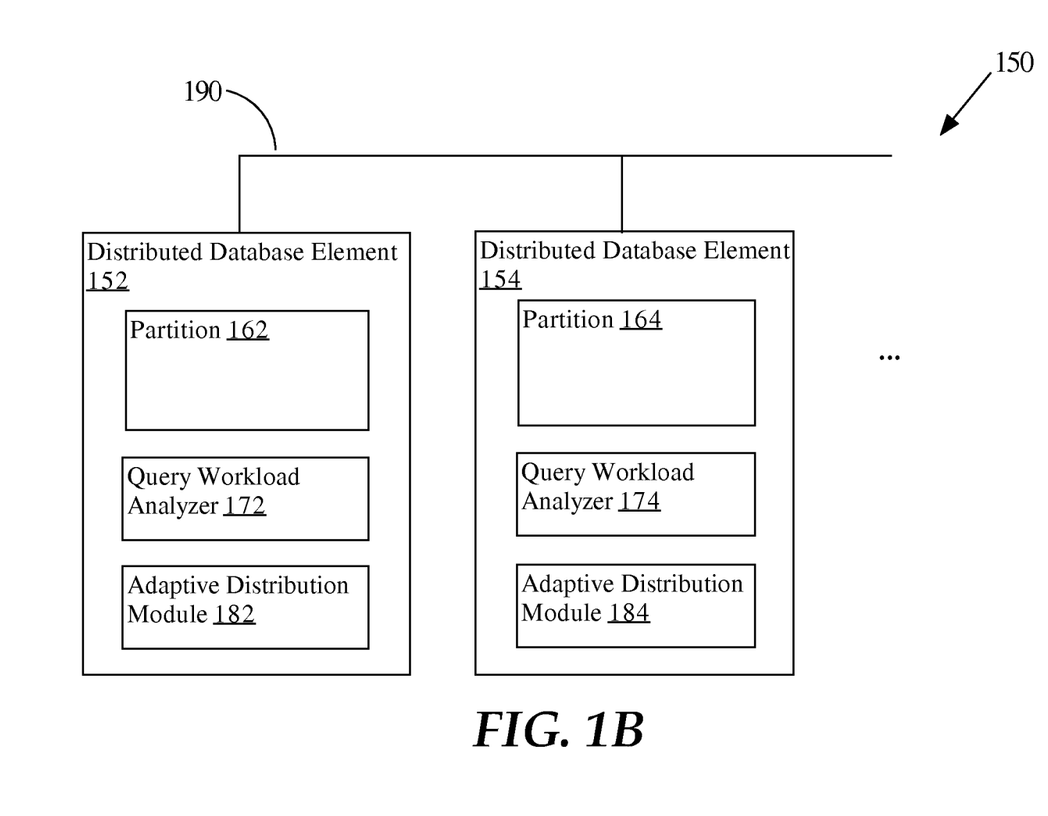

FIGS. 1A-1B are block diagrams of embodiments of distributed database systems on which the techniques described herein may be practiced. These distributed database systems are examples of distributed architectures on which the techniques described herein may be practiced. FIG. 1A illustrates centralized operations for one or more functions, while FIG. 1B illustrates fully distributed operations. A hybrid system that has both centralized operations and/or fully distributed options for one or more functions may be implemented, including functions for which both a fully distributed option and a centralized option are available. Other systems may include more or fewer components in different arrangements. Moreover, the distribution of work between components may vary from system to system.

FIG. 1A is a block diagram of an embodiment of a distributed database system 100 comprising a database manager 120. Database manager 120 performs one or more functions that involve controlling database functionality on one or more distributed database elements 102-104 on which data is stored. Although one database manager 120 is shown, multiple database managers 120 may be implemented for the distributed database system. Database manager 120 includes query workload analyzer 122 and adaptive remodeling module 124.

Query workload analyzer 122 analyzes the statistical properties of a live workload of the database at runtime. The statistical properties of the live workload are used to dynamically repartition and/or replicate the data set while the database is online. The statistical properties of the live workload shall be described in greater detail hereafter.

Adaptive distribution module 124 is configured to perform adaptive data repartitioning and/or adaptive data replication based on the statistical properties of the workload. In an embodiment, one or more data sets stored by distributed database system 100 are repartitioned and/or replicated by another partitioning key. In an embodiment, one or more data sets stored by distributed database system 100 are replicated. The replicated copy is partitioned by an additional repartitioning key. Distributed database system may store multiple replicated copies of a data set that are partitioned by different partitioning keys. Adaptive data repartitioning and adaptive data replication are described in greater detail hereafter.

Distributed database elements 102-104 are configured to participate in database operations. In an embodiment, distributed database elements 102-104 are database instances that are hosted on individual computing units that are interconnected via communication link 130, such as a network, and may include one or hardware and/or software components, including on-board socket-to-socket communication channels. For example, distributed database elements 102-104 may be hosted on server blades interconnected with other server blades on a rack and/or heterogeneous computing units that may or may not be physically coupled.

Distributed database elements 102-104 each store one or more partitions 112-114 of a distributed data set. Partitions 112-114 are determined based on a partitioning key. As used herein, the term "distributed data set" refers to a data set that is stored on two or more distributed database elements 102. In an embodiment, the data set comprises one or more tables. Although partitions 112-114 are shown for one data set, multiple distributed data sets may be stored by distributed database system 100 based on their respective partitioning keys.

In an embodiment, distributed database elements 102-104 store the respective partition 112-114 in an in-memory data store; that is, the data store is stored in volatile memory. In an embodiment, distributed database system 100 is an in-memory database comprising in-memory distributed database elements 102-104 that store data in volatile memory at run time. Such data may be persisted to disk storage for the ability to recover and restart.

FIG. 1B is a block diagram of an embodiment of a distributed database system 150 without a centralized database manager. Database system 150 includes a plurality of distributed database elements 152-154. In an embodiment, each distributed database element 152-154 is capable of acting as a standalone database server to process database queries and/or commands. Distributed database elements 152-154 each store one or more partitions 162-164 of a distributed data set. Although partitions 162-164 are shown for one data set, multiple distributed data sets may be stored by distributed database system 150 based on their respective partitioning keys. In an embodiment, distributed database elements 152-154 store the respective partition 162-164 in an in-memory data store, i.e. in volatile memory. The data can also be stored in non-volatile memory, such as a in a persistent data storage or file system.

Distributed database elements 152-154 each include a query workload analyzer 172-174 and an adaptive modeling module 182-184. Query workload analyzers 172-174 analyze the statistical properties of a workload handled by the database system 150 at runtime. In an embodiment, query workload analyzers 172-174 perform analysis of the statistical properties of the workload in a distributed manner. In an embodiment, the query workload analyzers 172-174 then exchange such statistical information to form a global model of the workload. This global model can then be used to dynamically repartition and/or replicate the data set based on the statistical properties of the live workload.

Adaptive distribution modules 182-184 are configured to perform adaptive data repartitioning and/or adaptive data replication based on the statistical properties of the workload. In an embodiment, adaptive distribution modules 182-184 may perform adaptive data repartitioning and/or adaptive data replication of the data set in a distributed manner.

Distributed database elements 152-154 may participate in database operations originating from another distributed database element 152-154. In an embodiment, distributed database elements 102-104 are database instances that are hosted on individual computing units that are interconnected via communication link 190, such as a network. For example, distributed database elements 152-154 may be hosted on server blades interconnected with other server blades on a rack and/or heterogeneous computing units that may or may not be physically coupled.

Partitioning Keys

A data set stored in a database, such as one or more data tables, may be partitioned for various reasons, such as to manage storage space requirements for large data sets, to allow for parallelized access, to facilitate join operations between tables, to co-locate data, and/or for other performance reasons.

In an embodiment, a table can be partitioned based on a partitioning key comprising one or more columns. The partitioning key determines the partition where each row of data will be stored. A database may be configured to automatically determine the appropriate partition based on the partitioning key for database operations such as SELECT, INSERT, UPDATE, and DELETE operations.

Given a partitioning key, a data set may be partitioned by the partitioning key based on range, hashing, specific values, any other distribution scheme for assigning data to different partitions, or a combination thereof. For example: in a hash distribution scheme, a table is partitioned based on a hash of one or more columns indicated by the partitioning key; in a reference distribution scheme, a table is partitioned based on a hash of one or more columns indicated by the partitioning key, where the one or more columns are selected to co-locate related data with respect to another table (e.g. orders placed by a specific customer may be co-located with other data related to the specific customer). The above-mentioned distribution schemes are examples of distribution schemes that may be used. Other distribution schemes, including tag-based distribution schemes, range-based distribution schemes, custom-defined distribution schemes, may be used in accordance with one or more embodiments described herein.

Reshuffling Overhead

A partitioning key is selected based on characteristics of a live workload to reduce the reshuffling overhead (i.e. the volume of data to be moved). While processing a live workload, statistical properties of the live workload are maintained. These statistical properties are lightweight and can be maintained with a negligible amount of overhead. For example, statistical parameters may be collected and/or calculated by one or more methods that do not require integration with a query optimizer. Based on the statistical properties of the live workload with respect to the data set, reshuffling overhead may be estimated. The estimations, which are based on the maintained statistical properties, are used to determine whether to repartition a data set by another partitioning key.

Figure 2A:
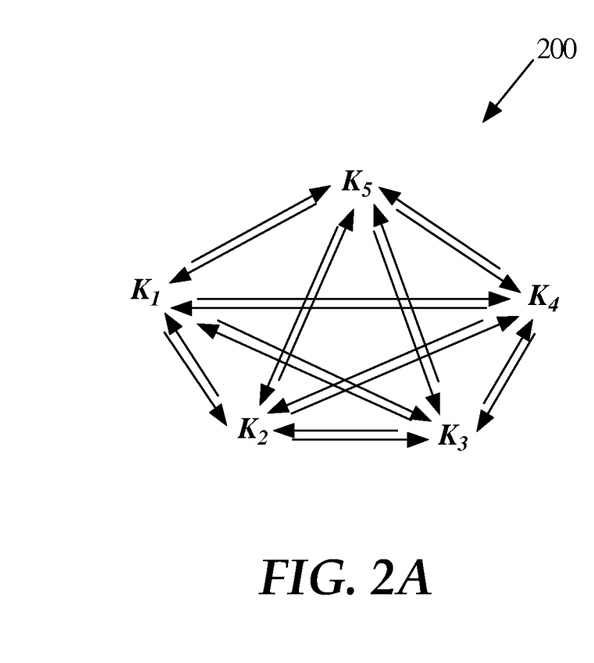
FIGS. 2A-2B are embodiments of a graph representation of reshuffling overheads for selected potential partitioning keys a data set.
Figure 2B:
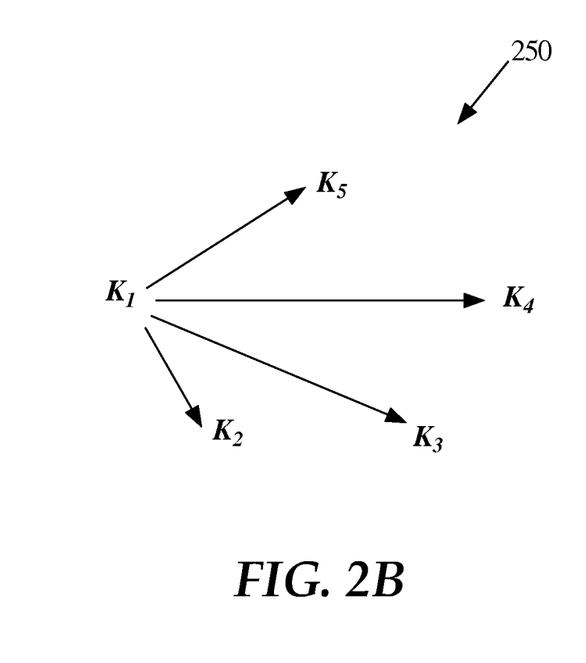

FIGS. 2A-2B are embodiments of a graph representation of estimated reshuffling overheads for a set of partitioning keys a data set. A weighted graph is used to model an expected volume of traffic to be moved due to reshuffling required by a workload. FIG. 2A is a graph representation of reshuffling overhead for a data set, such as a table. When adaptive repartitioning and/or adaptive replication is performed for multiple tables, reshuffling overhead for each of the tables may be modeled using this graph representation.

Graph 200 shows five possible partitioning keys $K_1$, $K_2$, $K_3$, $K_4$, and $K_5$ for the table. The nodes of graph 200 represent the set of potential partitioning keys employed by a workload. The set of partitioning keys may be selected by a user, automatically selected by one or more computing systems, or any combination thereof. To select a partitioning key for a data set, the reshuffling overheads introduced by each potential partitioning key is considered. In the graph model shown, this is equivalent to analyzing each spanning tree of graph 200 of unit depth. Each such spanning tree represents the estimated reshuffling overhead for the root partitioning key based on a current workload.

Each edge of graph 200 is assigned an edge weight that represents the reshuffling overhead to repartition the table from a first partitioning key to another partitioning key. In an embodiment, the edge weights represent a value based on the percentage of table data that needs to be exchanged to reshuffle the data set by the second partitioning key given that the data set is partitioned by the first partitioning key.

In an embodiment, the nodes of the graph 200 are also weighted. The weight of a node corresponding to a particular partitioning key corresponds to the likelihood of choosing the particular partitioning key by a workload. For example, if the weight of a first partitioning key is double the weight of a second partitioning key, this reflects the occurrence of the first partitioning key and the second partitioning key in the workload. For example, the queries of the workload that specify the table may specify the first partitioning key with twice the frequency than the queries specify the second partitioning key. Although a linear relationship is described in the example, the weight of a node corresponding to a partitioning key may be any function of the occurrence of the partitioning key in the workload, and may depend on additional factors.

FIG. 2B is a graph representation of reshuffling overhead to repartition a table from a current partitioning key, where $K_1$ is the current partitioning key. Graph 250 is a subset of graph 200, and includes edges from the current partitioning key $K_1$ to the remaining portioning keys $K_2$, $K_3$, $K_4$, and $K_5$. To determine the overhead of reshuffling by any other partitioning key when a table is partitioned based on the current partitioning key $K_1$, only the spanning tree of unit depth from the current partitioning key $K_1$ needs to be considered.

To determine whether another partitioning key is potentially more optimal than a current partitioning key $K_1$, the relevant reshuffling overhead corresponds to the edges shown in graph 200 are considered. Although FIGS. 2A-2B illustrate a graph representation of the data, any other representation of reshuffling overhead may be used.

Association Strength

Association strength is a measure of dependence between a pair of partitioning keys. In an embodiment, the association strength is a value between 0 and 1, where a value of 0 indicates that there is no association between the data set partitioned by a first partitioning key and the data set partitioned by the second partitioning key, and a value of 1 indicates that the data set partitioned by a first partitioning key and the data set partitioned by the second partitioning key are identical. One example of a pair of partitioning keys that may have a high association strength is JOB-TYPE and DEPARTMENT in an EMPLOYEE table.

For a set of partitioning keys where association strength is low, the weights of all the edges in graph 200 are expected to be roughly similar. However, in practice, there are many cases where keys exhibit some degree of association strength. As a result, the weights of the edges in graph 200 can differ based on the association strength between different columns of the table.

Figure 3:
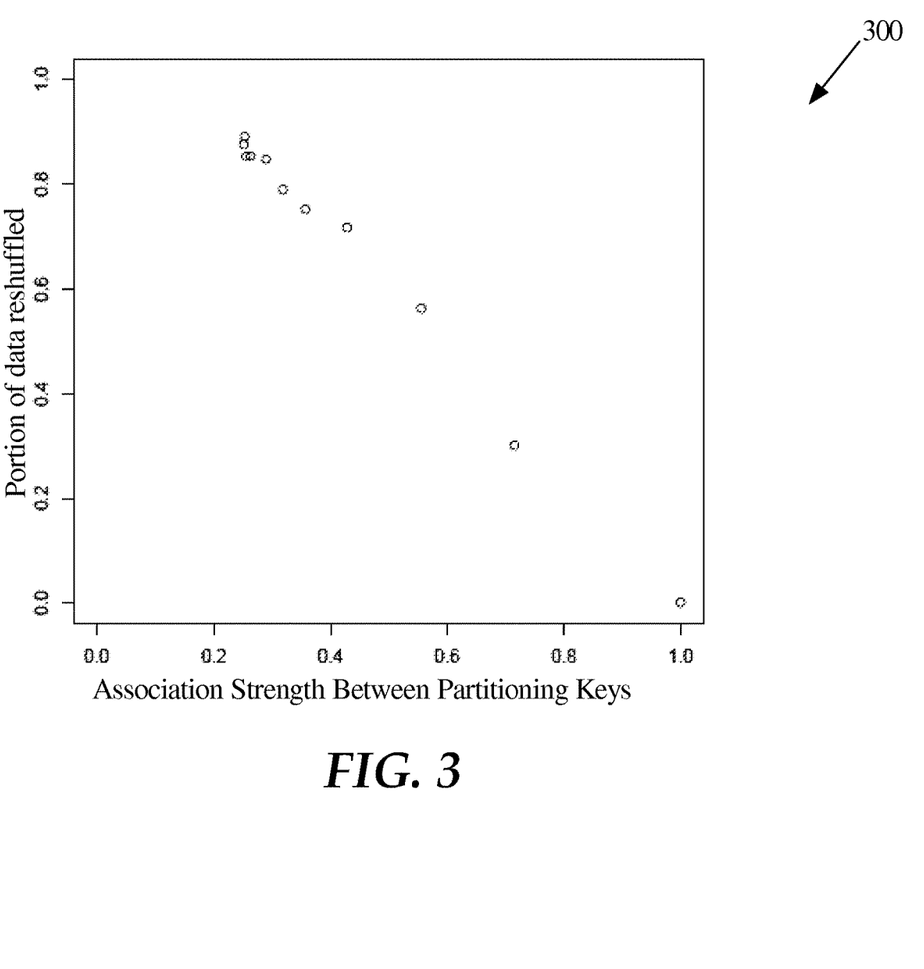
FIG. 3 is a graph showing an embodiment of a relationship between associated partitioning keys and a portion of data reshuffled.

The association strength between two variables may be calculated based on a formula that may be computed and/or updated in real time. For example, Cramer's V, a measure of association between two variables based on Pearson's chi-squared test statistic, may be used to calculate the association strength between two partitioning keys. FIG. 3 is a graph showing an embodiment of a relationship between the association strength and a reshuffled data volume. The association strength is determined based on Cramer's V. Each point reflects the association strength between a first partitioning key and a second partitioning key and the portion of a sample data set that must be moved to reshuffle the data set by the second partitioning key when the base data is partitioned by the first partitioning key. As shown in the graph, a relationship exists between the association strength and the portion of data that must be moved to reshuffle the data set. In an embodiment, a linear relationship is used to model the portion of data that must be moved to reshuffle the data set given the association strength between two partitioning keys. For example, a linear formula or another formula may be determined by fitting the formula based on real data points, such as the data points shown in FIG. 3. In an ideal approximation, the portion of data reshuffled is 0 for an association strength of 1, and the portion of data reshuffled is 1 for an association strength of 0; however, another formula may be used, such as when another formula is a better fit given a particular method for determining the association strength, the properties of a particular data set and/or the properties of a particular pair of partitioning keys of the particular data set.

As shall be described in greater detail hereafter, the association strength may be used to more accurately estimate the reshuffling overhead for reshuffling data based on a requested partitioning key when the base data is stored and partitioned by a base partitioning key, which may be used to determine whether to repartition the base data by another partitioning key.

Estimating Reshuffling Overhead Based on the Statistical Properties of a Workload Given a repartitioning graph G for a data set comprising a table T partitioned by initial partitioning key $K_s$, the expected volume of traffic EVT introduced due to reshuffling of table T by a workload can be represented in terms of the node and edge weights as:

$$EVT(G|_{K_s}) = \tau(T) \cdot \Sigma_i P(K_i) \cdot D(K_s, K_i) \qquad (1)$$

$EVT(G|_{K_s})$ denotes the expected volume of traffic for graph G given an initial partitioning key $K_s$. $\tau(T)$ corresponds to a weight of table T. When only one table T is monitored, $T(T)$ is not considered. However, when the data set comprises multiple tables, $\tau(T)$ corresponds to the likelihood of choosing a particular table T by a workload. For example, if the weight of a first table is double the weight of a second table, this reflects the occurrence of the first table and the second table in the workload. For example, the queries of the workload may specify the first table with twice the frequency than the queries specify the second table. Although a linear relationship is described in the example, the weight of a table T may be any function of the occurrence of the table in the workload, and may depend on additional factors. In an embodiment, $\tau(T)$ is a function of a likelihood of the workload selecting table T, $P(T)$, and the size of the table $|T|$, e.g. $\tau(T)=P(T) \cdot |T|$, where $P(T)$ is the likelihood of selecting table T by the workload. In an embodiment, a priority weight $p_T$ may be specified for a specific table T. A user, such as a user configuring the database, may assign different priorities to different tables. In this case, $\tau(T)$ is a function of a likelihood of the priority weight $_{pT}$. In an embodiment, P(T) is a table frequency metric that is based on a frequency of access of the table in the live workload.

$P(K_i)$ is the probability that partitioning key $K_i$ is identified by a query of the workload for reshuffling, which is described above. In an embodiment, $P(K_i)$ is a key frequency metric that describes a frequency of access of table T by partitioning key $K_i$ in the workload.

$D(K_s, K_i)$ is a data movement factor which represents the percentage of table data exchanged when reshuffling table T on partitioning key $K_i$ assuming an initial partitioning on key $K_s$. As noted above, in graph 200, $P(K_i)$ may correspond to a node weight of $K_i$. Data movement factor $D(K_s, K_i)$ can be further described in terms of the typical subset (e.g. as a percentage of fraction of the table T) of the table T involved in reshuffling table T by partitioning key $K_i$ (e.g. average percentage of result set after relevant filter/project operations), and the portion of data that needs to be exchanged on a reshuffling of table T by partitioning key $K_i$ when the table is partitioned on $K_s$. The data movement factor may be modeled as:

$$D(K_s, K_i) = \sigma_{avg}(K_i) \cdot \pi_{avg}(K_i) \cdot r(K_s, K_i) \quad (2)$$

$\sigma_{avg}(K_i)$ is the average selectivity on table T. In an embodiment, $\sigma_{avg}(K_i)$ is an average of selectivity over a number of operations in the workload that specify portioning key $K_i$). The selectivity of an operation indicates the amount of data that is actually necessary to move. For example, if a filter is applied before a data movement operation based on a partitioning key $K_i$, then the amount of reshuffling overhead is decreased. In an embodiment, $\pi_{avg}(K_i)$ is a projection metric based on one or more data processing commands in the live workload that describes an average amount of the data set required by data processing commands that identify partitioning key $K_i$.

$\pi_{avg}(K_i)$ corresponds to the average projections on table T. A projection produces an output based on the data. For example, for a row of data in a table, a projection could be a subset of the column values or a calculation based thereon. Projections also affect the amount of data that is necessary to move. In an embodiment, $\pi_{avg}(K_i)$ is a projection metric based on one or more data processing commands in the live workload that describes an average amount of the data set required by data processing commands that identify partitioning key $K_i$.

$r(K_s, K_i)$ represents the portion of table T moved to reshuffle table T by partitioning key $K_i$ and corresponds to the weight of an edge from $K_s$ to $K_i$ in repartitioning graph 200. In an embodiment, $r(K_s, K_i)$ is a percentage. The parameter $r(K_s, K_i)$, may be a function of the association strength between respective column data of partitioning key Ks and partitioning key Ki. Alternatively, $r(K_s, K_i)$ may be determined based on sampling. For example, a representative subset of table T may be partitioned by both partitioning key Ks and partitioning key Ki to extrapolate the value for $r(K_s, K_i)$ based on the representative sample.

To minimize the reshuffling overhead, we need to determine an initial partitioning key which leads to minimum EVT for the repartitioning graph over various choices of the partitioning keys. This minimization problem can be represented as:

$$EVT(G) = MIN_{Ks}\{EVT(G|_{Ks})\} \quad (3)$$

The selection of the best partitioning key is the one that leads to the minimum value of EVT(G) for table T.

Processing the Live Workload

To make the selection of the best partitioning key, we need to determine the values for the various parameters specified in our aforementioned model. While certain parameters can be determined based on apriori dataset characteristics (e.g. |T|), one can use Bayesian statistical methods to refine our estimates for the other parameters. In an embodiment, different parameters of the statistical model may be updated at different frequencies. In an embodiment, some parameters of the statistical model are frequently updated, such as parameters dependent on workload commands, while other parameters are updated less frequently, such as the size of table |T| or $r(K_s, K_i)$.

An initial partitioning key should be selected before the database is live since no live workload data has been generated. In an embodiment, a model is calibrated in an offline training mode using a set of offline queries Q representative the targeted workload W. Alternatively, a model may be generated by supplying the model with sample statistical values that are generated by a user or generated by the set of offline queries Q. Alternatively, a model may be generated by supplying the model with one or more default or user-specified statistical parameters. After the offline selection of the partitioning key for each of one or more tables T, the selection of the partitioning key can be refined online based on the live workload.

While running the queries of the live workload, the relevant statistical properties of the live workload are gathered. In an embodiment, statistical properties such as the parameters $K_i$, P(T), $\sigma_{avg}(K_i)$, $\pi_{avg}(K_i)$, and $r(K_s, K_i)$ are determined based on calculations that have a modest overhead and do not substantially affect the performance of the database.

In an embodiment, a model comprising formulas (1)-(3) is used. As noted above, initial values for one or more parameters, e.g. $K_i$, P(T), $\sigma_{avg}(K_i)$, $\pi_{avg}(K_i)$, and $r(K_s, K_i)$, may have been determined to choose the initial partitioning key. In an embodiment, one or more statistical parameters are modified as a live workload is processed. For example, a weighted average, a moving average or another adaptive statistical method may be used to update the statistical parameters.

In an embodiment, the value for one or more parameters is updated based on the prior determined parameter value and an input value. That is, instead of recalculating the parameter based on a large set of recent commands in the workload, the parameter is simply updated based on its current parameter value and the next input value, which may be determined based on one or more incoming commands processed in the workload.

The commands in a workload are not necessarily spaced out evenly in time. The workload commands may be time stamped, and the time stamp of such commands may be used to update the statistical values. In an embodiment, one or more statistical parameters are updated at a particular time that is recorded. The next time the statistical parameter is updated, the last update time and the time associated with one or more currently processed commands of the workload are taken into account. For example, if a parameter value is updated to $X_0$ at time $t_0$, and a new measurement $x_i$ arrives at time $t_i$, then the new value of the measurement $X_i$ may be a function of $X_0$, $x_i$, and $t_i$ and/or $t_0$. In an embodiment, $X_i = \exp(-b(t_i-t_0)) \cdot x_i + 1$. After computing $X_i$, it is only necessary to retain the values $X_i$ and $t_i$.

When the accumulated changes in the parameters of the model (e.g. formulas (1)-(2)) are statistically significant and stable, it is determined whether the reshuffling workload minimization formula values (e.g. formula (3)) identifies another partitioning key. In an embodiment, the model is periodically evaluated to determine if repartitioning is optimal. If repartitioning T by another partitioning key will bring sufficient benefit, the base table T is repartitioned by the other partitioning key. The benefit may be calculated based on the statistical calculations described above. For example, benefit may be measured as $(EVT(G)-EVT_{minimum}(G))/EVT(G)$.

In an embodiment, additional logic may be used to determine whether the partitioning key for a table T should be changed. Other factors, such as repartitioning cost, avoidance of thrashing, scheduling factors, and other such factors, may be taken into account to determine whether to reparation T by another partitioning key, and/or when to perform such a repartitioning.

Online Repartitioning

In an embodiment, after it is determined that a table T should be repartitioned by another partitioning key, repartitioning T may be performed while the database is online (as well as offline). In an embodiment, one or more repartitioning tasks are scheduled to minimize disturbance of the online system.

Example Repartitioning Process

Figure 4:
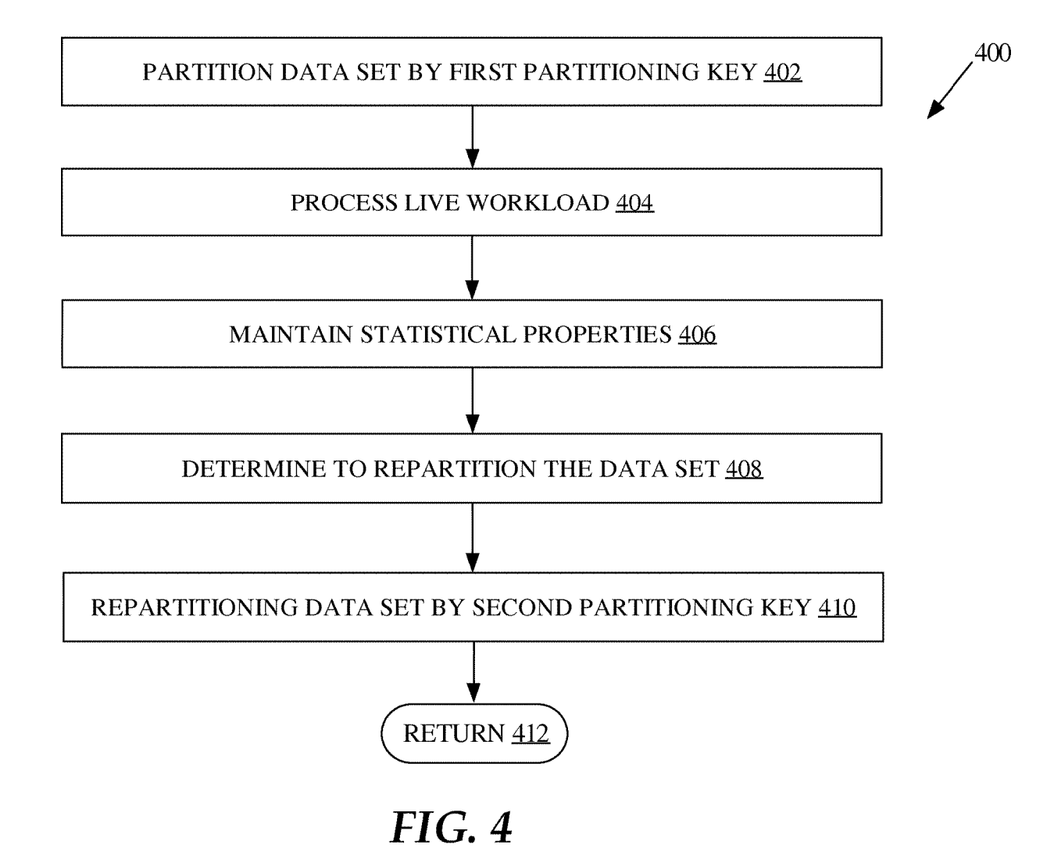
FIG. 4 is a flowchart illustrating an embodiment of a process for adaptive repartitioning of a data set.

FIG. 4 is a flowchart illustrating an embodiment of a process for adaptive repartitioning of a data set. One or more blocks of process 400 may be performed by one or more computing devices and/or processes thereof. In an embodiment, one or more blocks of process 400 is performed by one or more database servers, including one or more database server instances. Process 400 may be performed simultaneously for multiple datasets, such as multiple tables.

At block 402, a data set stored in a database is partitioned by a first partitioning key. At block 404, a live workload is processed. The live workload comprises a plurality of data processing commands. At block 406, statistical properties of the live workload are maintained. In an embodiment, the statistical properties are maintained while processing the live workload. At block 408, it is determined to repartition the data set by a second partitioning key. The determination is based on the statistical properties of the live workload with respect to the data set. At block 410, the data set is repartitioned by the second partitioning key. At block 412, process 400 returns and/or terminates. For example, processing may continue to processing another database transaction in the direct connection, another database transaction in another direct connection, another distributed database transaction, another database operation, passing control to a calling process, generating any appropriate record or notification, returning after a method or function invocation, or terminating.

Example Replication Process

Figure 5:
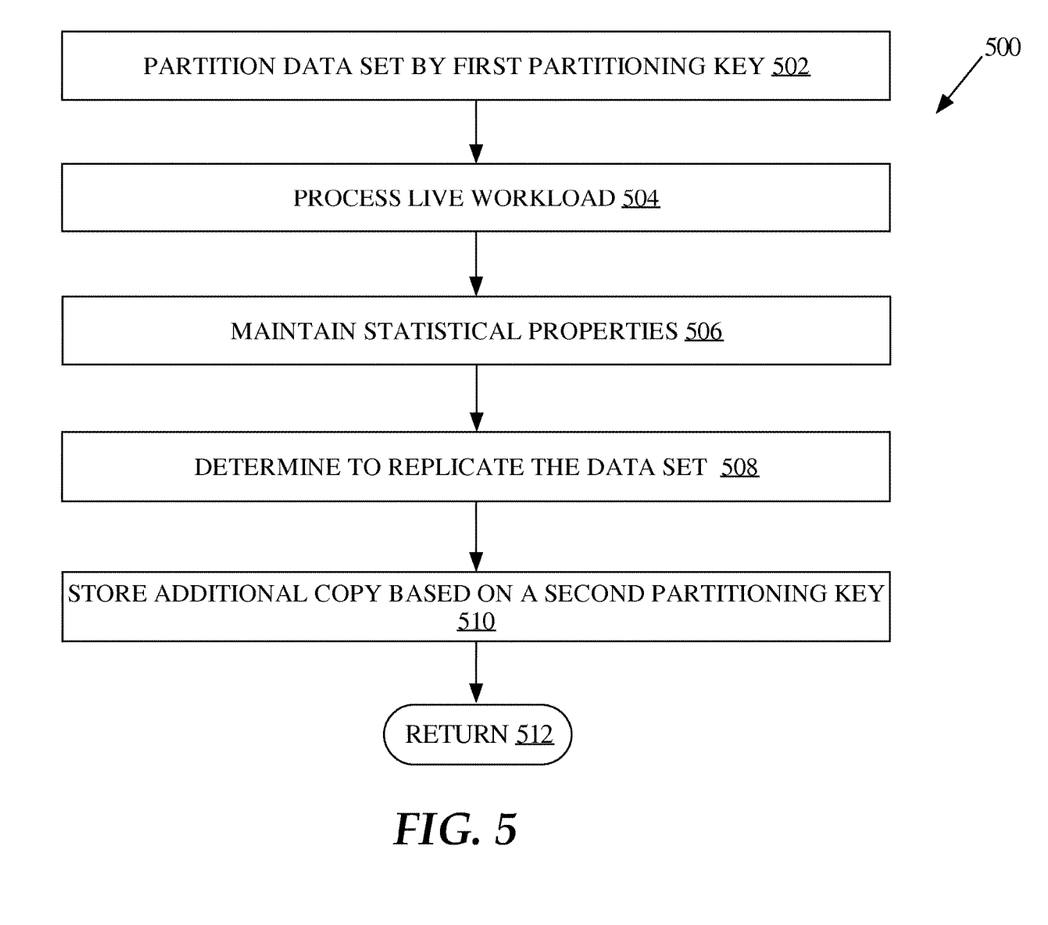
FIG. 5 is a flowchart illustrating an embodiment of a process for adaptive replication of a data set.

FIG. 5 is a flowchart illustrating an embodiment of a process for adaptive replication of a data set. One or more blocks of process 500 may be performed by one or more computing devices and/or processes thereof. In an embodiment, one or more blocks of process 500 is performed by one or more database servers, including one or more database server instances. Process 500 may be performed simultaneously for multiple datasets, such as multiple tables.

At block 502, a data set stored in a database is partitioned by a first partitioning key. At block 504, a live workload is processed. The live workload comprises a plurality of data processing commands. At block 506, statistical properties of the live workload are maintained. In an embodiment, the statistical properties are maintained while processing the live workload. At block 508, it is determined to replicate the data set in the database based on a second partitioning key. The determination is based on the statistical properties of the live workload with respect to the data set. At block 510, an additional copy of the data set is stored in the database. The additional copy of the data set is partitioned by the second partitioning key. At block 512, process 500 returns and/or terminates. For example, processing may continue to process another database transaction in the direct connection, another database transaction in another direct connection, another distributed database transaction, another database operation, passing control to a calling process, generating any appropriate record or notification, returning after a method or function invocation, or terminating.

Database Systems

One or more embodiments described herein may be used in the context of database management systems (DBMSs). Therefore, a description of an example DBMS is provided.

A DBMS manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A query is a database command that includes request for information from the database that returns a record set, which may be an empty record set. A query is typically submitted as a statement in a query language that is interpreted by a database server to cause one or more database operations.

One database language for expressing database commands is the Structured Query Language (SQL). There are many different versions of SQL, some versions are standard and some proprietary, and there are a variety of extensions. Data definition language ("DDL") commands are issued to a DBMS to create or configure database objects, such as tables, views, or complex data types. SQL/XML is a common extension of SQL used when manipulating XML data in an object-relational database. Data manipulation language ("DML") instructions are issued to a DBMS to manage data stored within a database structure. For instance, SELECT, INSERT, UPDATE, and DELETE are common examples of DML instructions found in some SQL implementations.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Hardware Overview

According to an embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
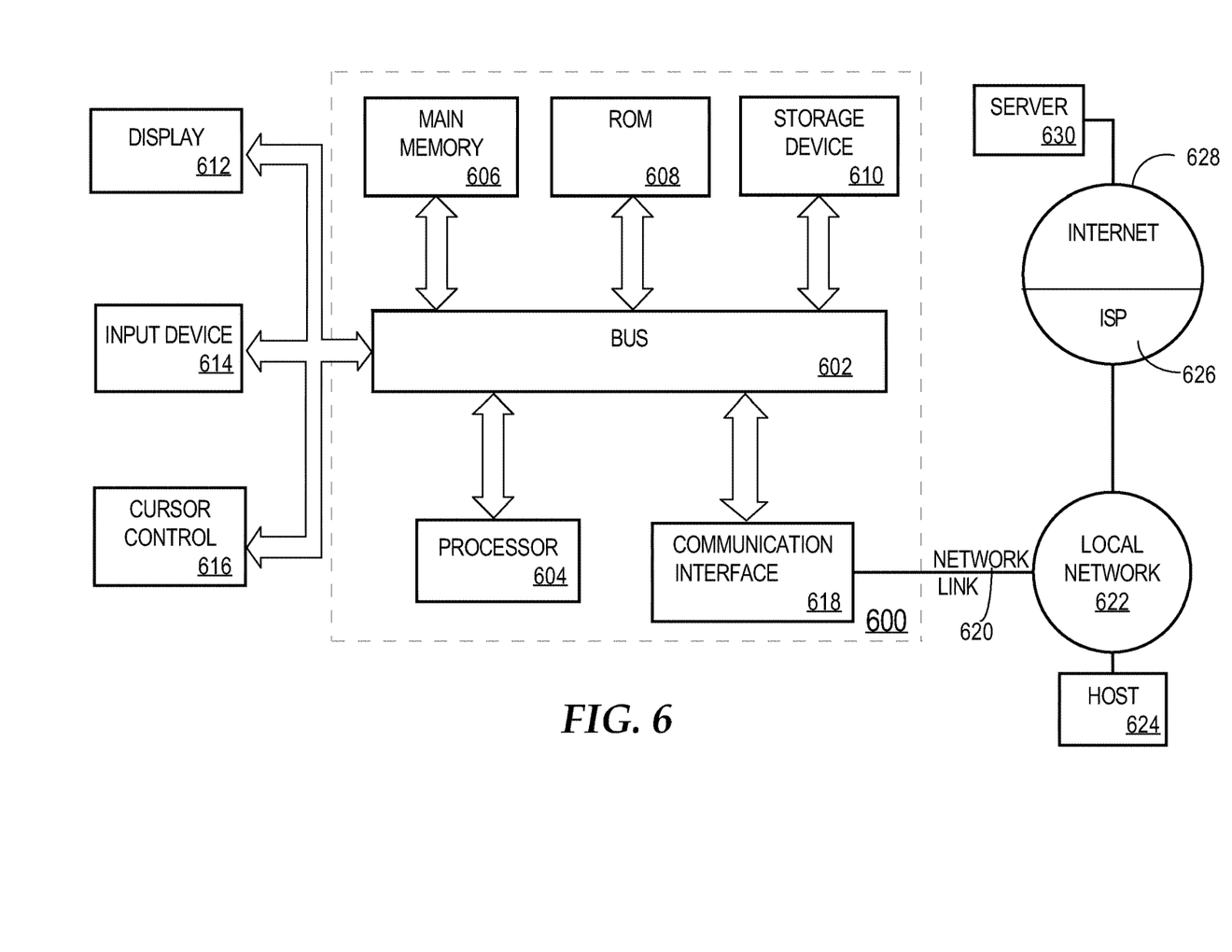
FIG. 6 illustrates a computer system upon which one or more embodiments may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to an embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    partitioning a data set stored in a distributed data processing system by a first partitioning key;
    processing a live workload comprising a plurality of data processing commands;
    while processing the live workload, maintaining statistical properties of the live workload and receiving a query; and
    while executing the query as part of the live workload:
        based on the statistical properties of the live workload with respect to the data set, determining to repartition the data set by a second partitioning key that is selected based on a percentage of the data set to transfer to repartition the data set by the second partitioning key; and
        repartitioning the data set in the distributed data processing system by the second partitioning key;
    wherein the method is performed by one or more computing devices.

2. The method of claim 1, further comprising:
    partitioning a second data set stored in the distributed data processing system by a third partitioning key;
    based on the statistical properties of the live workload with respect to the second data set, determining to replicate the second data set in the distributed data processing system based on a fourth partitioning key;
    storing an additional copy of the second data set in the distributed data processing system, wherein the additional copy of the second data set is partitioned by the fourth partitioning key.

3. The method of claim 1, wherein the first partitioning key is selected based on initial workload statistic values.

4. The method of claim 1, wherein the first partitioning key is selected based on statistical properties of a sample workload.

5. The method of claim 1, wherein determining to repartition the data set by a second partitioning key is further based on an association strength between the first partitioning key and the second partitioning key.

6. The method of claim 1, wherein the statistical properties comprise a selectivity metric for one or more data processing commands in the live workload, wherein the selectivity metric is based on an average amount of the data set required by the one or more data processing commands.

7. The method of claim 1, wherein the statistical properties comprise a projection metric for one or more data processing commands in the live workload, wherein the projection metric is based on an average amount of the data set required by the one or more data processing commands.

8. The method of claim 1, wherein the statistical properties comprise a key frequency metric for a particular partitioning key of the data set, wherein the key frequency metric is based on a frequency of access of the data set by the particular partitioning key in the live workload.

9. The method of claim 1, wherein the statistical properties comprise a table frequency metric for the data set, wherein the table frequency metric is based on a frequency of access of the data set in the live workload.

10. A method comprising:
    partitioning a data set stored in a distributed data processing system by a first partitioning key;
    processing a live workload comprising a plurality of data processing commands;
    while processing the live workload, maintaining statistical properties of the live workload and receiving a query; and
    while executing the query as part of the live workload:
        based on the statistical properties of the live workload with respect to the data set, determining to replicate the data set in the distributed data processing system based on a second partitioning key that is selected based on a percentage of the data set to transfer to repartition the data set by the second partitioning key; and
        storing an additional copy of the data set in the distributed data processing system, wherein the additional copy of the data set is partitioned by the second partitioning key;
    wherein the method is performed by one or more computing devices.

11. The method of claim 10, wherein said determining to replicate the data set is further based on an available amount of memory.

12. A non-transitory computer-readable medium storing instructions which, when executed by one or more processors, cause:

partitioning a data set stored in a distributed data processing system by a first partitioning key;

processing a live workload comprising a plurality of data processing commands;

while processing the live workload, maintaining statistical properties of the live workload and receiving a query; and while executing the query as part of the live workload:
based on a query plan of the query and the statistical properties of the live workload with respect to the data set, determining to repartition the data set by a second partitioning key that is selected based on a percentage of the data set to transfer to repartition the data set by the second partitioning key; and repartitioning the data set in the distributed data processing system by the second partitioning key.

13. The non-transitory computer-readable medium of claim 12, wherein the instructions further cause:

partitioning a second data set stored in the distributed data processing system by a third partitioning key;

based on the statistical properties of the live workload with respect to the second data set, determining to replicate the second data set in the distributed data processing system based on a fourth partitioning key;

storing an additional copy of the second data set in the distributed data processing system, wherein the additional copy of the second data set is partitioned by the fourth partitioning key.

14. The non-transitory computer-readable medium of claim 12, wherein the first partitioning key is selected based on initial workload statistic values.

15. The non-transitory computer-readable medium of claim 12, wherein the first partitioning key is selected based on statistical properties of a sample workload.

16. The non-transitory computer-readable medium of claim 12, wherein determining to repartition the data set by a second partitioning key is further based on an association strength between the first partitioning key and the second partitioning key.

17. The non-transitory computer-readable medium of claim 12, wherein the statistical properties comprise a selectivity metric for one or more data processing commands in the live workload, wherein the selectivity metric is based on an average amount of the data set required by the one or more data processing commands.

18. The non-transitory computer-readable medium of claim 12, wherein the statistical properties comprise a projection metric for one or more data processing commands in the live workload, wherein the projection metric is based on an average amount of the data set required by the one or more data processing commands.

19. The non-transitory computer-readable medium of claim 12, wherein the statistical properties comprise a key frequency metric for a particular partitioning key of the data set, wherein the key frequency metric is based on a frequency of access of the data set by the particular partitioning key in the live workload.

20. The non-transitory computer-readable medium of claim 12, wherein the statistical properties comprise a table frequency metric for the data set, wherein the table frequency metric is based on a frequency of access of the data set in the live workload.

21. A non-transitory computer-readable medium storing instructions which, when executed by one or more processors, cause:

partitioning a data set stored in a distributed data processing system by a first partitioning key;

processing a live workload comprising a plurality of data processing commands;

while processing the live workload, maintaining statistical properties of the live workload and receiving a query; and while executing the query as part of the live workload:
based on a query plan of the query and the statistical properties of the live workload with respect to the data set, determining to replicate the data set in the distributed data processing system based on a second partitioning key that is selected based on a percentage of the data set to transfer to repartition the data set by the second partitioning key; and storing an additional copy of the data set in the distributed data processing system, wherein the additional copy of the data set is partitioned by the second partitioning key.

22. The non-transitory computer-readable medium of claim 21, wherein said determining to replicate the data set is further based on an available amount of memory.

* * * * *

UNITED STATES PATENT AND TRADEMARK OFFICE
CERTIFICATE OF CORRECTION

PATENT NO.         : 10,223,437 B2
APPLICATION NO.    : 14/634199
DATED              : March 5, 2019
INVENTOR(S)        : Klots et al.

It is certified that error appears in the above-identified patent and that said Letters Patent is hereby corrected as shown below:

In the Specification

In Column 2, Line 39, delete "set." and insert -- set; --, therefor.

In Column 2, Line 42, delete "reshuffled." and insert -- reshuffled; --, therefor.

In Column 3, Line 50, delete "system ." and insert -- system. --, therefor.

In Column 8, Line 42, delete "Properites" and insert -- Properties --, therefor.

In Column 8, Line 53, delete "T(T)" and insert -- $\tau(T)$ --, therefor.

In Column 9, Line 5, delete "weight $_{PT}$" and insert -- weight $p_T$. --, therefor.

In Column 9, Line 13, delete "D($K_s$, $K_i$))" and insert -- D($K_s$, $K_i$) --, therefor.

In Column 9, Line 17, delete "D($K_s$, $K_i$))" and insert -- D($K_s$, $K_i$) --, therefor.

In Column 9, Line 31, delete "key $K_i$)." and insert -- key $K_i$. --, therefor.

Signed and Sealed this
Third Day of March, 2020

Andrei Iancu
*Director of the United States Patent and Trademark Office*